United States Patent [19]
Bruno

[11] Patent Number: 5,271,487
[45] Date of Patent: Dec. 21, 1993

[54] STABILIZED DRIVEN DISK ASSEMBLY AND METHOD OF INSTALLING A CLUTCH INCLUDING SAME

[75] Inventor: Frank L. Bruno, Ft. Wayne, Ind.

[73] Assignee: Dana Corporation, Toledo, Ohio

[21] Appl. No.: 982,318

[22] Filed: Nov. 27, 1992

[51] Int. Cl.⁵ .............................................. F16D 3/14
[52] U.S. Cl. ............................... 192/106.2; 192/70.13;
192/DIG. 1; 29/525.1; 464/64; 403/2; 403/12
[58] Field of Search ............... 192/106.1, 106.2, 70.13,
192/DIG. 1; 29/525.1; 464/64, 66, 67; 403/2,
11, 12

[56] References Cited

U.S. PATENT DOCUMENTS

| | | | |
|---|---|---|---|
| 1,608,050 | 11/1926 | Bailey | 74/440 |
| 1,879,569 | 9/1932 | Snow, Jr. | 192/70.13 X |
| 3,672,032 | 6/1972 | Witherspoon | 29/424 |
| 3,897,535 | 7/1975 | Lapac et al. | 264/268 |
| 3,921,343 | 11/1975 | Speyer | 51/323 |
| 4,254,855 | 3/1981 | Hildebrand et al. | 192/106.2 |
| 4,339,867 | 7/1982 | Reznik | 29/559 |
| 4,796,743 | 1/1989 | Hallerback | 192/70.13 X |
| 4,811,826 | 3/1989 | Kittel et al. | 192/70.13 |
| 4,843,697 | 7/1989 | Marshall | 29/156.5 |
| 4,899,862 | 2/1990 | Graton et al. | 192/106.2 |
| 4,963,216 | 10/1990 | Watkins | 156/291 |
| 5,172,608 | 12/1992 | Schultz et al. | 403/11 X |

FOREIGN PATENT DOCUMENTS 439040 11/1935 United Kingdom ............ 192/70.13

Primary Examiner—Leslie A. Braun
Assistant Examiner—Andrea Pitts
Attorney, Agent, or Firm—Millen, White, Zelano, & Branigan

[57] ABSTRACT

A driven disk assembly includes a hub assembly and a support plate assembly to which friction pads are attached. If the driven disk assembly includes a free travel feature wherein the hub assembly is free to rotate slightly with respect to the support plate assembly, it is difficult to align splines of the hub assembly with cooperating splines of a transmission input shaft upon installing a clutch including the driven disk assembly within a drive train. In order to negate free travel prior to installation, a small quantity of rupturable material is disposed within a slot that accommodates lost motion between the support plate assembly and hub assembly. Upon initially rotating the support plate assembly, the material ruptures, allowing relative motion between the support plate assembly and hub assembly so that the free travel feature and damping springs disposed between the assemblies function as intended.

12 Claims, 5 Drawing Sheets

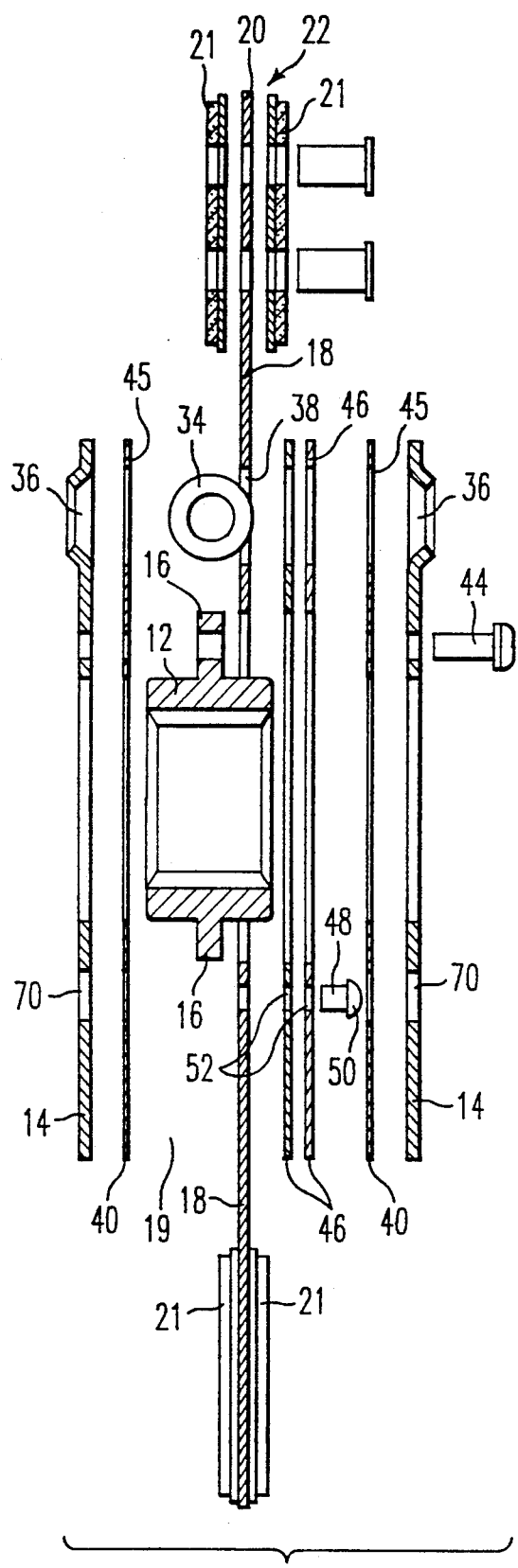
FIG. 2
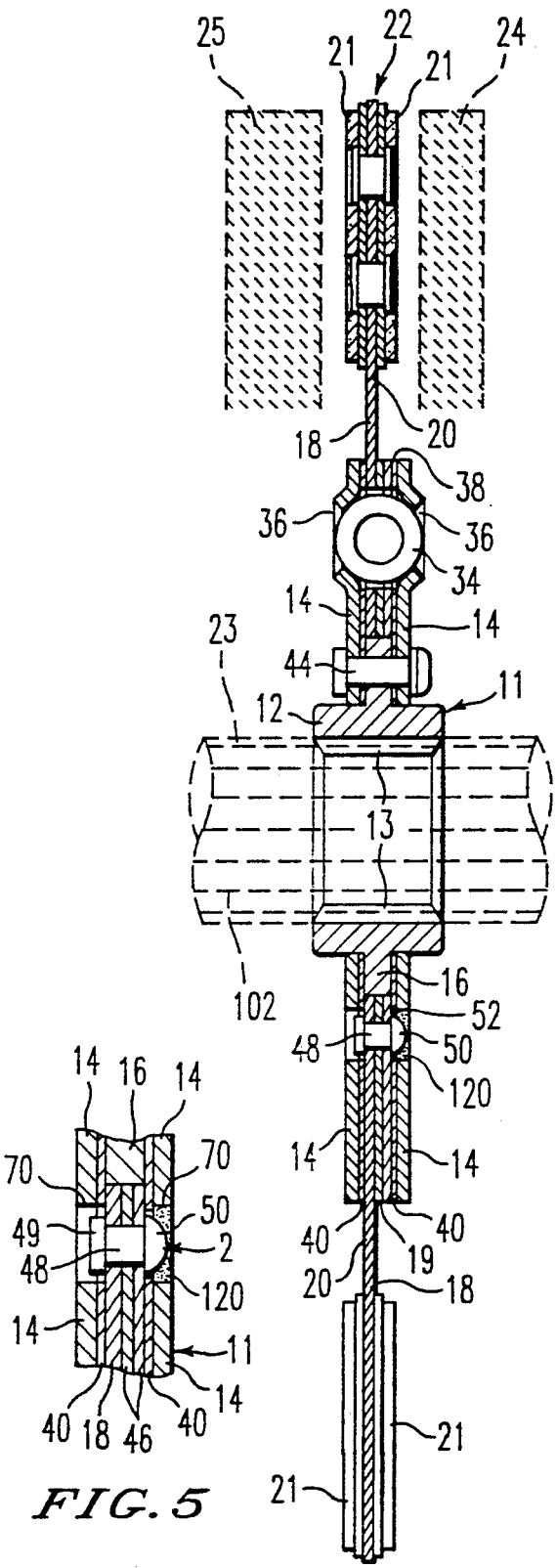
FIG. 5
FIG. 3

STABILIZED DRIVEN DISK ASSEMBLY AND METHOD OF INSTALLING A CLUTCH INCLUDING SAME

FIELD OF THE INVENTION

The instant invention relates to a stabilized driven disk assembly and method of installing same, and more particularly, the instant invention relates to a stabilized driven disk assembly and method f or installing same, wherein the driven disk assembly includes a damper which provides for relative motion between a splined hub assembly portion and a supporting plate portion, which plate portion mounts friction pads.

BACKGROUND ART

In conventional passenger cars and trucks, objectionable drive line vibrations may occur at certain speeds and load conditions. Some of these disturbances may be eliminated or reduced to an acceptable level by the incorporation of a proportional damper in the driven disk portion of the vehicle clutch. As is illustrated in U.S. Pat. No. 4,254,855, damping is normally provided by a plurality of circumferentially spaced coil springs, operatively connected between relatively rotatable elements of the clutch driven disk assembly.

Clutches which are currently utilized transmit relatively low levels of torque when in the release mode of less than 4 inch-pounds so that the clutches will function properly with the very efficient transmissions currently being manufactured. It has been found that free travel driven disk assemblies enable clutches used with highly efficient transmissions to function better. In free travel driven disk assemblies, damping springs do not engage immediately upon applying torque through the clutch but allow for slight lost motion. These clutches result in the hub assembly portion of the clutch being loose with respect to the support plate portion for the friction pads. Since the hub assembly is loose, it will rotate slightly with respect to the support plate when the support plate is urged against the flywheel during the engaged mode. This makes it difficult to insert through the clutch the splined input shaft from the transmission when installing the clutch in a drive train of the vehicle. This difficulty is exacerbated when there are two disk assemblies as is frequently the situation. In that free travel driven disk assemblies increase aggravation and assembly time for installers both on assembly lines and in repair shops, there is a need for a solution to the problem.

SUMMARY OF THE INVENTION

In view of the aforementioned problem, it is an object of the instant invention to provide a new and improved, stabilized driven disk assembly having a structure which facilitates quicker assembly, as well as an object to provide a method of installing a clutch utilizing the new and improved, stabilized driven disk assembly.

In view of this object and other objects, a driven disk assembly for a clutch comprises a hub assembly including a splined hub for non-rotatable, sliding engagement with a splined input shaft from a transmission and a support plate for supporting friction pads. The support plate is disposed coaxially with respect to the hub assembly and is coupled thereto by a lost-motion connection which allows relative rotation between the hub assembly and support plate. The hub assembly is temporarily restrained from rotation with respect to the support plate so that a clutch including the driven disk assembly may be more easily installed between a flywheel and transmission.

The invention further contemplates a method of installing between a flywheel and transmission input shaft a clutch including a driven disk assembly with a free travel damper, wherein the free travel is temporarily negated until after the clutch is installed.

In accordance with a preferred embodiment of the invention, initial rotation between a hub assembly and support plate assembly is precluded by placing a mass of rupturable material between spaced, but facing, portions thereof.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 2 is a side exploded view of the driven disk assembly of FIG. 1;

FIG. 3 is a side elevation of the driven disk assembly of FIG. 1;

FIG. 5 is an enlarged side elevation of the portion of the driven disk assembly illustrated in FIG. 4;

DESCRIPTION OF A PREFERRED EMBODIMENT

Figure 1:
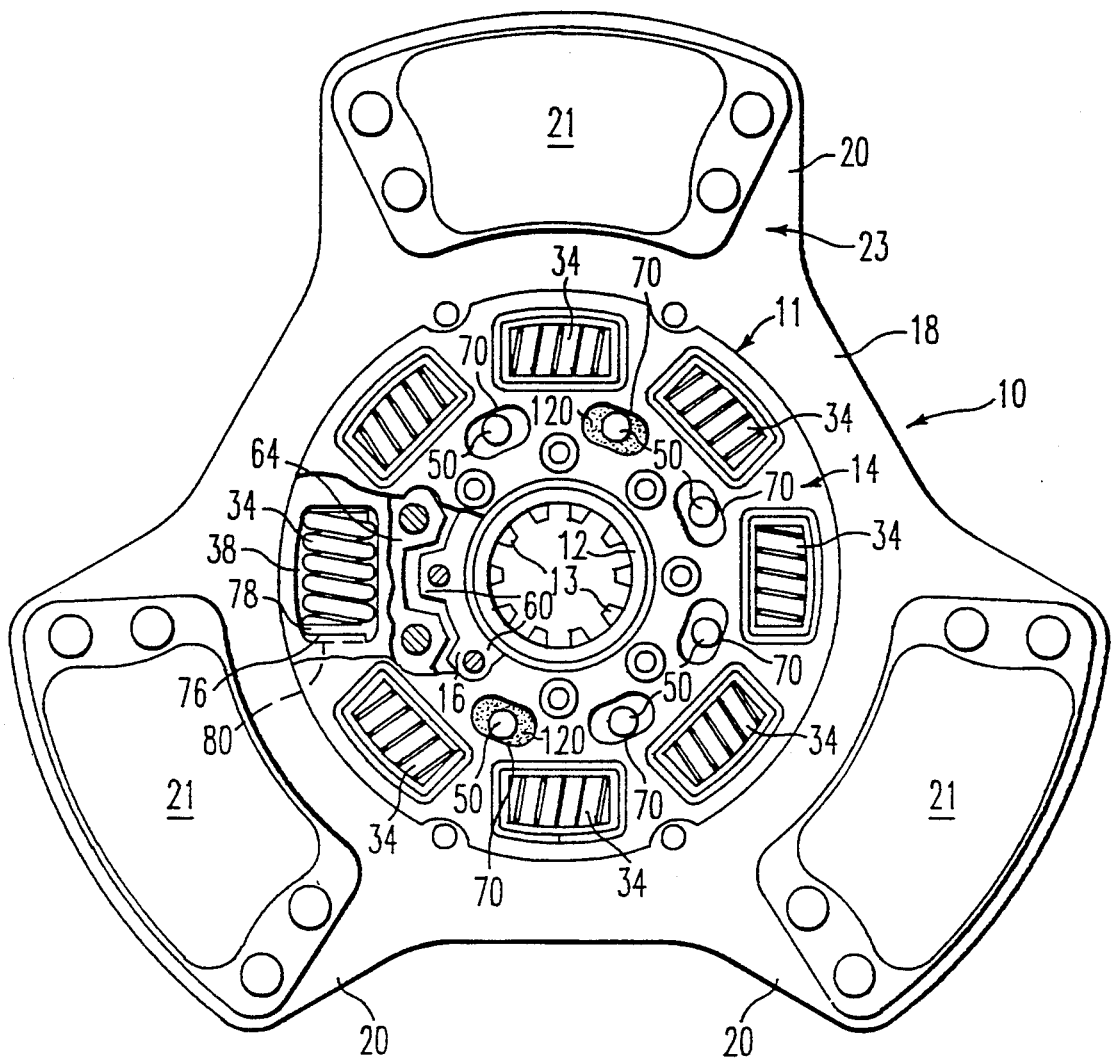
FIG. 1 is a partially broken away front view of a driven disk assembly for a clutch, the assembly incorporating the principles in the instant invention.

Referring now to FIGS. 1-3, a dampened driven disk assembly 10 provides a torque transmitting device. In normal practice, the disk assembly 10 is the driven portion of a clutch which is normally positioned in a vehicle power line. The driven disk assembly 10 includes rotary torque transmitting elements connected by dampers designed to establish a resilient drive between the rotary elements. Dampers are needed to tune the vehicle drive train system so that critical torsional vibrations are removed therefrom over the operating speed range of the engine.

In a preferred embodiment, the disk assembly 10 includes a hub assembly portion 11 comprising a splined hub 12 with splines 13 and a pair of spaced outer annular covers 14. Unitary with the hub 12 is a radially extending annular flange 16 which is sandwiched between the covers 14.

Coaxially mounted with respect to the hub assembly 11 is a support plate 18 which has unitary, radially outwardly extending arms 20. Friction pads 21 are secured to opposite sides of the outermost portions of the arms 20. The support plate 18 is located in an axial space 19 disposed between the outer covers 14 and forms a support plate assembly 22.

The hub 12 is splined to a transmission input shaft 23 and the friction pads 21 are positioned between an axially movable clutch pressure plate schematically shown at 24 and an axially stationary driven flywheel 25. The driven disk assembly 10 is free to move axially on the transmission input shaft 23 for a limited distance but will always rotate with the transmission input shaft.

It is essential that the damper unit not only establish a driving connection between the rotary clutch elements, but also absorb the torque of the engine, thereby eliminating chatter and rattle in the vehicle power line. Moreover, when the clutch is in the disengaged mode, it is important to keep the torque passed through the clutch as low as possible so that the clutch can function properly with highly efficient transmissions.

In accordance with a preferred embodiment of the invention, the driven disk assembly 10 includes an array of coil springs 34 circumferentially spaced within the driven disk assembly. Aligned openings 36 in the covers 14 and 38 in the support plate 18, respectively, are provided for receiving and retaining the coil springs 34 so that they are in a position to transmit rotary drive between the covers 14 and support plate 18.

A pair of secondary or auxiliary cover members 40 are disposed on opposite sides of the annular hub flange 16 and inside the outer covers 14. A series of rivets 44 extend through bores in the hub flange 16, main cover 14 and auxiliary cover 40 to secure these parts to one another as an integral structure. The auxiliary covers 40 are provided with stamped openings 45 for alignment with the openings 36 in the main covers 14 and 38 in the support plate 18.

To substantially fill the axial space between the auxiliary covers 40, there are provided a plurality of flat, annular reinforcing plates 46 positioned on one side of the support plate 18. An array of rivets 48 having heads 49 and 50 are received in complementary bores 52 through reinforcing plates 46 so that the support plate 18 and reinforcing plates rotate together as an integral unit.

From the description thus far, it is evident that the hub 12 and the inner and outer covers 14 and 40, respectively, are secured together to rotate as the rotatable driven member of the clutch disk assembly 11. The rotatable driving member for the clutch disk assembly 10 is comprised of the support plate assembly 22.

In addition to the resilient drive connection provided by coil springs 34, there is a positive drive connection provided between the driven structure, which is the splined hub assembly 11, and the driving structure, which is the support plate assembly 22. Due to the coil springs 34 disposed between radial surfaces on the support plate assembly 22 and radial surfaces on the splined hub assembly 11 the drive is resilient prior to the occurrence of the positive drive. This is accomplished by a lost motion connection which permits the coil springs 34 to function prior to any direct drive being established between the support plate assembly 22 and the splined hub assembly 11.

As is seen in FIG. 1, lost motion is achieved through a plurality of outwardly directed teeth 60 on the outer periphery of the hub flange 16 and a plurality of inwardly directed teeth 64 on the interior surfaces of support plate 18 and reinforcing plates 46. The outwardly directed teeth 60 are normally maintained by the springs 34 in a position midway and equally spaced from contact with the inwardly directed teeth 64. The spacing is designed to permit limited, relative rotary movement between the hub 12 and support plate 18 during which time the coil springs 34 function in their intended manner, i.e., to absorb or prevent minor transmission of shock loads and torsional vibration in the drive line and to establish the initial resilient drive connection between the splined hub assembly 11 and the support plate assembly 22.

In order to accommodate the limited rotation that occurs between the splined hub assembly 11 and the support plate assembly 22, circumferentially elongated openings 70 are provided in the covers 14 and 40 into which the opposed heads 49 and 50 of the rivets 48 project forming pin-in-slot connections. The openings 70 permit the necessary clearance for the rivet heads 49 and 50 as the coaxial springs 34 are being compressed to establish the resilient driving connection which absorbs shocks and vibrations in the vehicle drive train. In essence, it can be concluded that the rivets 48 with rivet heads 49 and 50 are part of the support plate assembly 22 while the slots 70 in the covers 14 are part of the splined hub assembly 11.

In order to provide the driven disk assembly 10 with the advantages of a free travel feature wherein the coil springs 34 do not engage immediately upon rotation of the support plate 18 with respect to the hub 12, a slight gap 76 is provided between the ends 78 of the coil springs and the abutting radial surfaces 80 of the support plate and is splined hub assemblies 15 and 11. Due to the resulting slack, the support plate 18 is loose with respect to the hub 12. When the flywheel 25 (FIG. 3) is rotating the support plate 18, opposite ends of the coil springs 34 engage the ends of the slots 36 and 38 and the slack is eliminated.

Since the hub assembly 11 is loose with respect to the support plate assembly 22, when the hub assembly is mounted on the flywheel 25, the splines 13 of the hub 12 are not necessarily lined up to receive splines 102 on the transmission shaft 23. Consequently, it can be quite difficult to slidably couple the transmission shaft 23 with the hub assembly since the splines may interfere with one another rather than slide past one another with the gaps between the splines 13 of the hub receiving the splines 102 of the transmission input shaft. This is especially the case if there are two driven disk assemblies 10 within a single clutch as is the case in FIGS. 6–8. The problem is complicated because the disk assemblies 10 are within a clutch housing 106 which is bolted to the flywheel 25 and are therefore not accessible except through the opening in the housing which receives the transmission input shaft 23.

Figure 6:
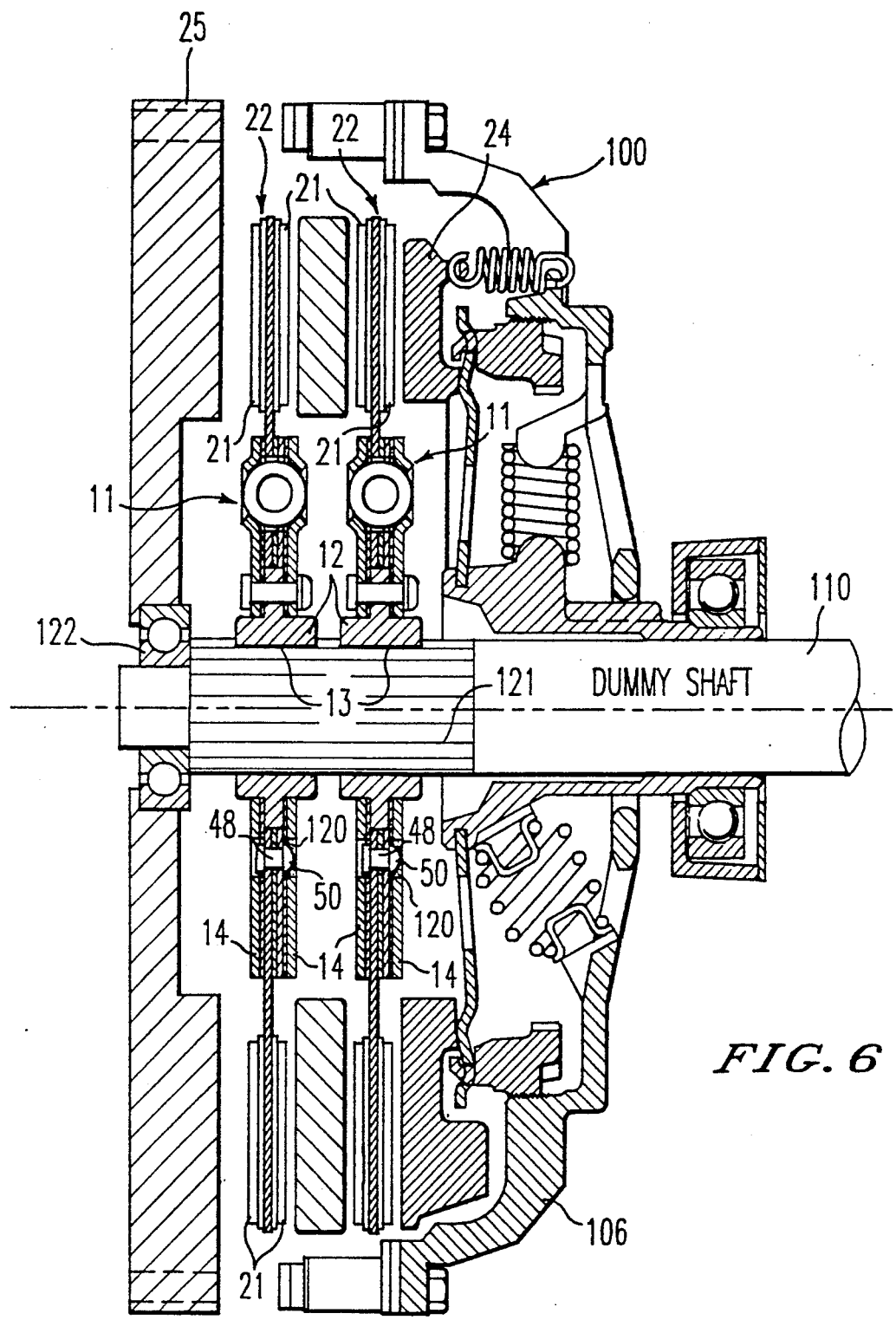
FIG. 6 is a side elevation showing a clutch employing a pair of driven disk assemblies such as that of FIGS. 1-5 with a dummy shaft inserted in the clutch prior to bolting a clutch housing to a flywheel.

As is seen in FIG. 6, the splines 13 of the hub 12 are initially aligned with a dummy shaft 110, however, when the dummy shaft 110 is removed, the hub 12 is free to move the splines 13 due to the gap 76 (FIG. 1) between the springs 34 and the ends 80 (FIG. 1) in the openings 38 in support plate 18.

Figure 4:
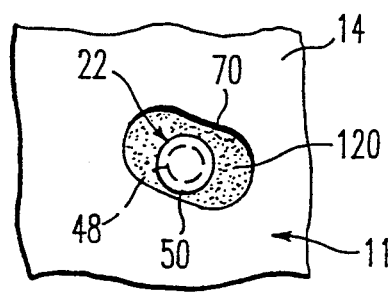
FIG. 4 is an enlarged front view of a portion of the driven disk assembly of FIG. 1.

With reference primarily to FIGS. 4 and 5, in order to solve this problem, the splined hub assembly 11 is temporarily locked or stabilized with respect to the support plate assembly 22 so that the hub assembly and support plate assembly rotate together in integral fashion. In accordance with the preferred embodiment of the instant invention, this is accomplished by selecting one or more, and preferably two of the slots 70 positioned 180° from one another and filling the slots with a rigid material 120. Preferably, the rigid material 120 is applied in liquid form by pouring a small quantity thereof into the slot 70 so as to take up the space between at least one of the rivet heads 50 and the peripheral wall of the slot 70. The rivet heads 50 normally form pins for the pin-in-slot connection with the slot 70 which allows the splined hub assembly 11 to rotate slightly with respect to the support plate assembly 22. The material 120 then hardens to prevent movement of the rivet heads 50 within the slots 70. Since the bodies of the rivets 48 are snugly received in the bores 52 through the support plate 18 and reinforcing plates 46, the hub splined assembly 11 and support plate assembly 22 are locked to one another and stabilized by the material 120 so as to provide a positive drive.

Exemplary of a preferable hardenable material 120 is the adhesive Loctite TM which, when poured in the slot 70, fills not only the space between the peripheral wall of the slot and at least one of the rivet heads 49 or 50, but also wicks into the spaces proximate the slot and rivet before hardening. Upon the adhesive 120 hardening, a rigid connection is established between the support plate assembly 22 and hub assembly 11.

Figure 7:
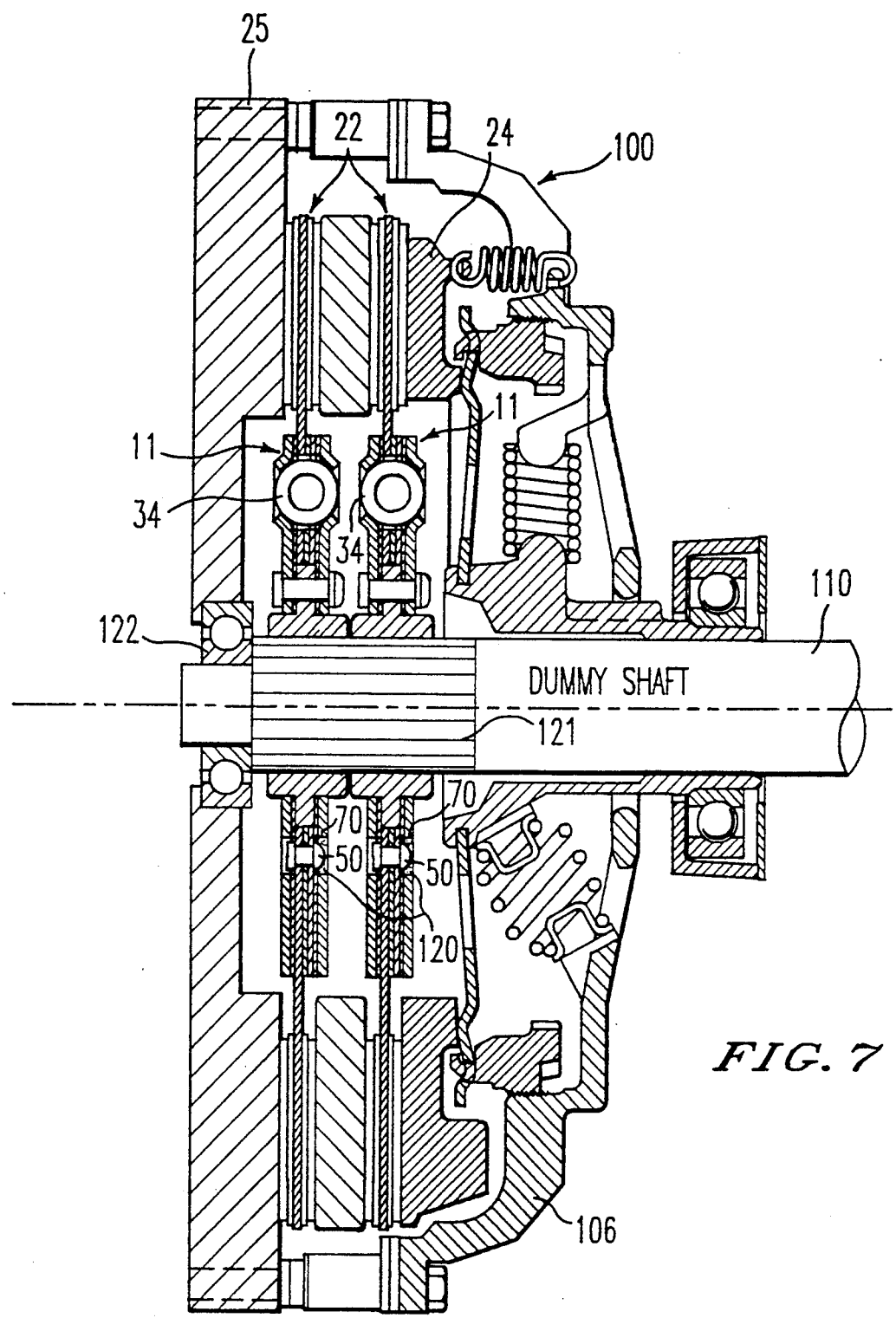
FIG. 7 is a view similar to FIG. 6 but showing the clutch housing bolted to the flywheel.
Figure 8:
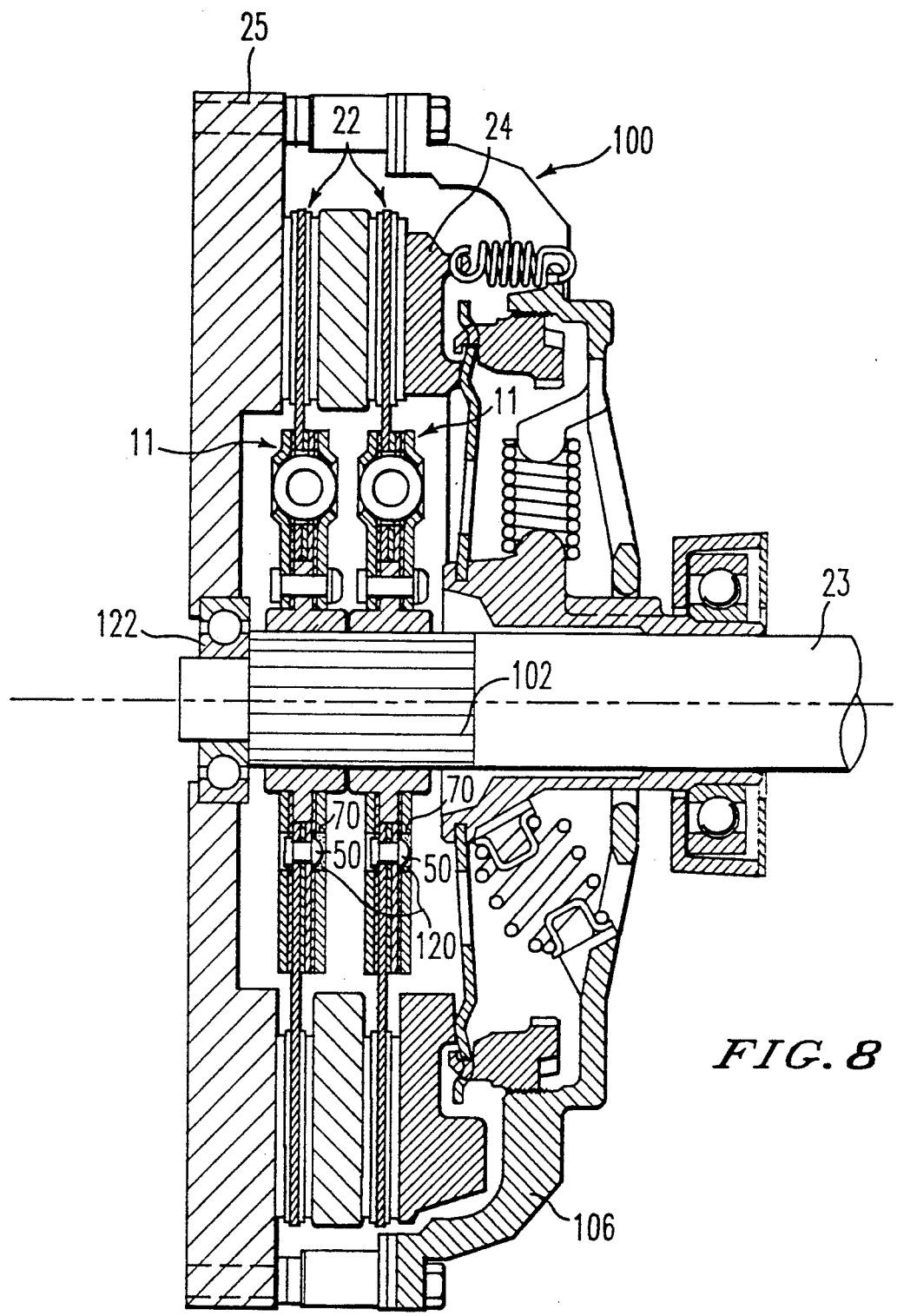
FIG. 8 is a view similar to FIG. 7 but showing a transmission input shaft replacing the dummy shaft when the clutch is installed between the flywheel and a transmission.

Referring now primarily to FIGS. 6-8, since the splined hub assembly 11 restrained by the material 120 does not move with respect to the support plate assembly 22 when the clutch 100 is in the disengaged mode, splines 121 of the dummy shaft maintain proper alignment to the splines 13 before engaging the clutch. After the clutch 100 is engaged (FIG. 7), the splines 13 are fixed in a rotational position. The dummy shaft 110 is then removed and the transmission input shaft 23 inserted so that the splines 102 on the transmission shaft 23 are received between the gaps of the splines 13 on the hub 12. As is seen in FIG. 8, sliding the transmission input shaft 23 through the splined hub 12 and into registration with the center bearing 122 of the flywheel 25 installs the clutch 10 in the drive train.

Upon rotating the flywheel 25, the clutch plate 18 also rotates because the friction pads 21 are held in engagement with the flywheel 25. Since the transmission from which the transmission input shaft 23 projects resists rotation of the splined hub 12 by the support plate 18, stress is placed on the material 120. The stress causes the material 120 to rupture. Once the material 120 ruptures, then the free travel provided by the gap 76 (FIG. 1) occurs which allows damping action of coil springs 34 to begin. Since there is but a very small quantity of the material 120, the material does not affect the operation of the clutch 100 and the clutch functions as designed.

By utilizing the small mass of material 120, clutches employing driven disk assemblies 10 having a free travel feature are not only easier and less expensive to initially assemble, but can be reassembled after repair by again filling the space 70 with a small quantity of the same or a similar material.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A driven disk assembly for a clutch comprising:
   a hub assembly including a splined hub for nonrotatable sliding engagement with a splined transmission input shaft;
   a support plate for supporting friction pads, the support plate being disposed coaxially with respect to the hub assembly;
   a lost-motion connection having slack and disposed between the hub assembly and the support plate for rotating the hub assembly with the support plate assembly when the clutch is engaged and the slack is eliminated; and
   temporary stabilizing means for negating lost motion between the support plate and hub assembly whereby the temporary stabilizing means automatically disengages when the clutch is installed and run.

2. The driven disk assembly of claim 1, wherein the temporary stabilizing means is disposed in the lost motion connection.

3. The driven disk assembly of claim 2, wherein the stabilizing means comprises a mass of rupturable material positioned to take up the slack in the lost motion connection.

4. The driven disk assembly of claim 3, wherein the mass of rupturable material is solidified from a liquid.

5. The driven disk assembly of claim 4, wherein the liquid is Loctite TM adhesive.

6. The driven disk assembly of claim 2, wherein the lost-motion connection comprises a pin projecting in an axial direction from the support plate and a slot in the hub for receiving the pin.

7. The driven disk assembly of claim 6, wherein the lost motion connection includes a biasing means disposed between the hub assembly and the support plate, the biasing means being engaged only after relatively rotary movement between the hub assembly and support plate to provide limited free travel between the hub assembly and support plate.

8. The driven disk assembly of claim 7, wherein the stabilizing means comprises a mass of rupturable material disposed to take up the slack in the lost motion connection.

9. The driven disk assembly of claim 8, wherein the mass of rupturable material is solidified from a liquid.

10. The driven disk assembly of claim 9, wherein the liquid is Loctite TM adhesive.

11. A driven disk assembly for a clutch including a free travel damper, the driven disk assembly comprising:
    a splined hub assembly including a splined hub for non-rotatable sliding engagement with a splined transmission input shaft;
    a support plate assembly for supporting friction pads, the support plate assembly being disposed coaxially with respect to the splined hub assembly;
    an array of coil springs disposed between the assemblies to provide damping;
    a gap disposed between each of the coil springs and one of the assemblies;
    a lost motion connection between the assemblies; and
    temporary stabilizing means for negating lost motion between the assemblies whereby the temporary stabilizing means automatically disengages when the clutch is installed and run.

12. The driven disk assembly of claim 11, wherein the lost motion connection is a pin-in-slot connection and wherein the temporary stabilizing means is a quantity of rupturable solid material deposited in the pin-in-slot connection to provide a positive connection between the assemblies until the clutch is installed and run whereupon the material ruptures and the pin-in-slot connection restores lost notion.

* * * * *